United States Patent
Kang et al.

(10) Patent No.: US 7,841,231 B2
(45) Date of Patent: Nov. 30, 2010

(54) STEERING ANGLE SENSING APPARATUS AND METHOD THEREOF

(75) Inventors: Kyong Ho Kang, Ansan-si (KR); Choon Wook Park, Yangcheon-gu (KR); Sung Kyu Bae, Ansan-si (KR); Chang Hwan Lee, Gyeongsan-si (KR)

(73) Assignee: LG Innotek Co., Ltd., Seoul (KR)

( * ) Notice: Subject to any disclaimer, the term of this patent is extended or adjusted under 35 U.S.C. 154(b) by 182 days.

(21) Appl. No.: 11/997,553

(22) PCT Filed: Jul. 13, 2007

(86) PCT No.: PCT/KR2007/003414

§ 371 (c)(1),
(2), (4) Date: Jan. 31, 2008

(87) PCT Pub. No.: WO2008/013372

PCT Pub. Date: Jan. 31, 2008

(65) Prior Publication Data

US 2008/0307873 A1 Dec. 18, 2008

(30) Foreign Application Priority Data

| Jul. 25, 2006 | (KR) | 10-2006-0069564 |
| Oct. 18, 2006 | (KR) | 10-2006-0101333 |
| Oct. 19, 2006 | (KR) | 10-2006-0101871 |
| Jul. 5, 2007 | (KR) | 10-2007-0067496 |

(51) Int. Cl.
*G01M 17/06* (2006.01)
(52) U.S. Cl. .................................................. 73/117.02
(58) Field of Classification Search .............. 73/117.01, 73/117.02
See application file for complete search history.

(56) References Cited

U.S. PATENT DOCUMENTS

| 5,683,351 | A | 11/1997 | Kaiser et al. |
| 5,930,905 | A | 8/1999 | Zabler et al. |
| 6,578,437 | B1 | 6/2003 | Moerbe |
| 6,931,312 | B2 * | 8/2005 | Shin ........................... 701/41 |
| 7,000,487 | B2 * | 2/2006 | Takuma ................. 73/862.333 |
| 2004/0059486 | A1 | 3/2004 | Takuma et al. |
| 2004/0078166 | A1 * | 4/2004 | Shin ........................... 702/145 |
| 2004/0118220 | A1 * | 6/2004 | Takuma ................. 73/862.333 |
| 2004/0145364 | A1 | 7/2004 | Onishi et al. |
| 2005/0030011 | A1 | 2/2005 | Shimizu et al. |
| 2005/0075828 | A1 | 4/2005 | Sakabe et al. |
| 2005/0104580 | A1 | 5/2005 | Ushihara et al. |
| 2006/0042403 | A1 | 3/2006 | Oike et al. |

(Continued)

FOREIGN PATENT DOCUMENTS

JP 2002-101692 A 4/2002

(Continued)

*Primary Examiner*—Eric S McCall
(74) *Attorney, Agent, or Firm*—Saliwanchik, Lloyd & Saliwanchik

(57) ABSTRACT

A steering angle sensing apparatus and method are provided. The apparatus and method sense the steering angle of a steering shaft by using a rotated bit value difference corresponding to the rotated angles of magnets, which are respectively coupled on an axis of one of a plurality of sub gears, when the sub gears with respectively different gear ratios rotate with a shaft gear that rotates together with the steering shaft.

19 Claims, 6 Drawing Sheets

U.S. PATENT DOCUMENTS

2006/0208176 A1    9/2006    Shimizu et al.

FOREIGN PATENT DOCUMENTS

| JP | 2002-340618 A | 11/2002 |
| JP | 2004-045087 A | 2/2004 |
| JP | 2004-093502 A | 3/2004 |
| JP | 2004-361212 A | 12/2004 |
| JP | 2005-140557 A | 6/2005 |
| JP | 2006-098235 A | 4/2006 |
| KR | 10-2002-0055407 | 3/2004 |
| KR | 10-2002-0063791 | 4/2004 |

* cited by examiner

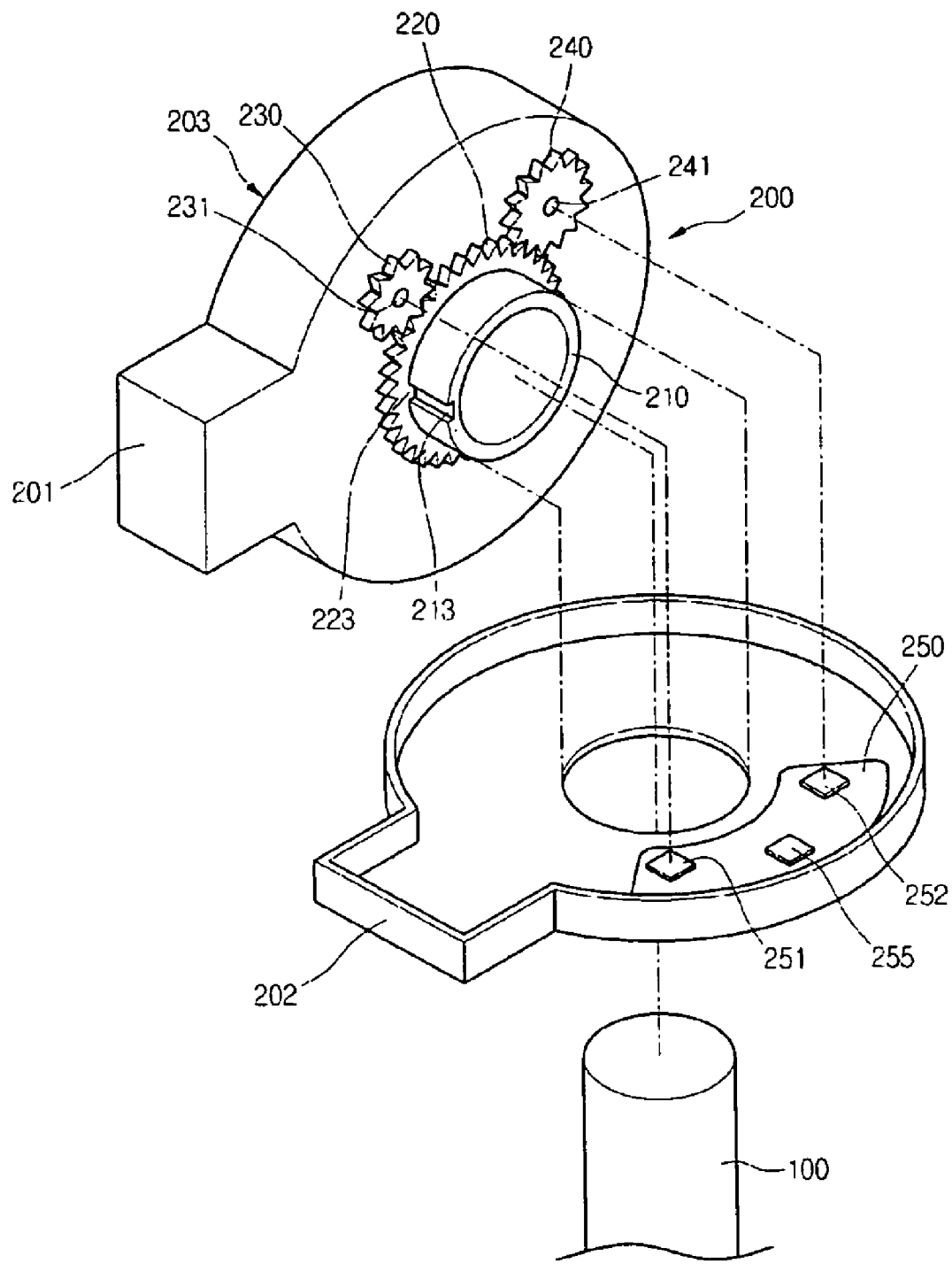
[Fig. 1]

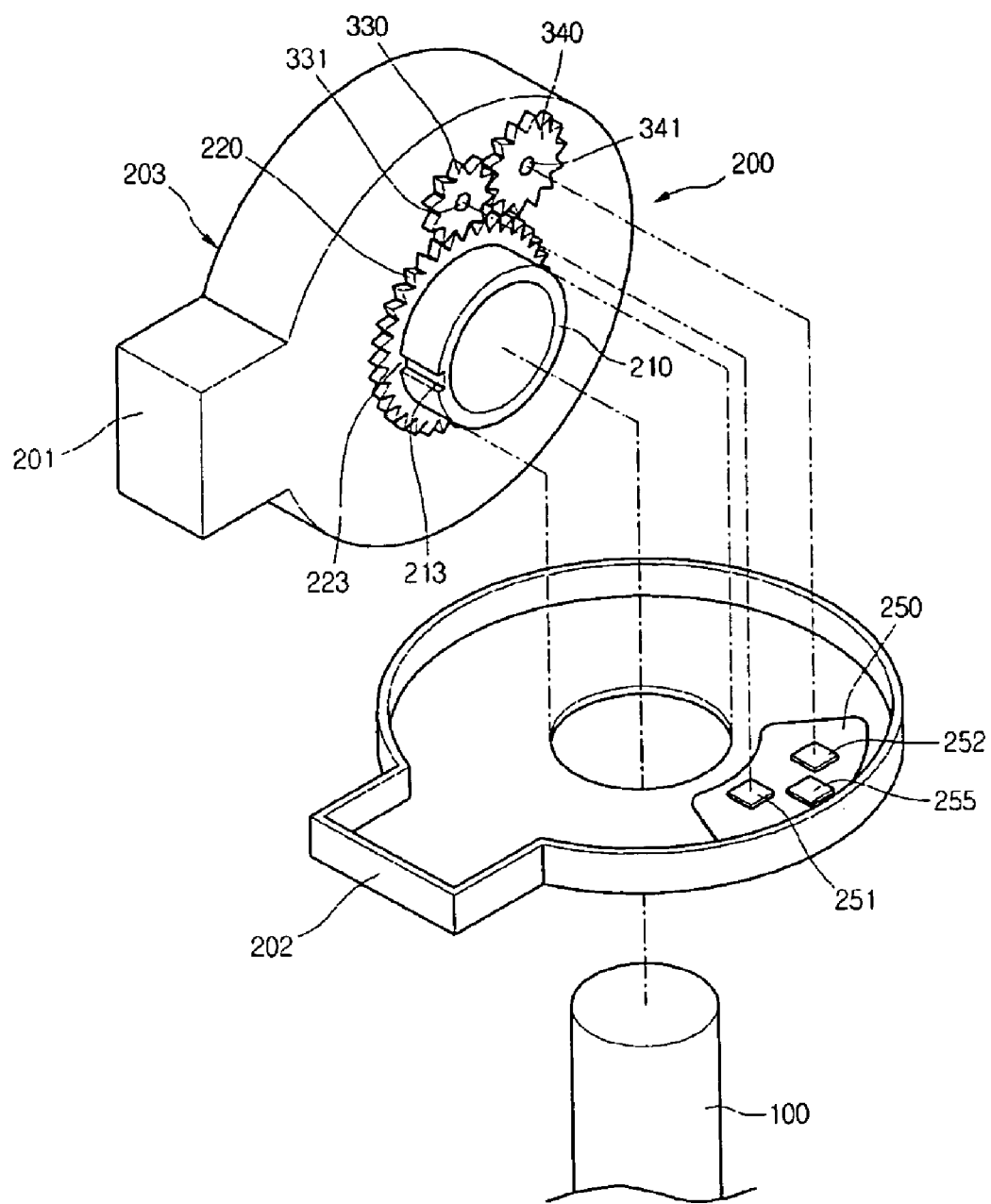
[Fig. 2]

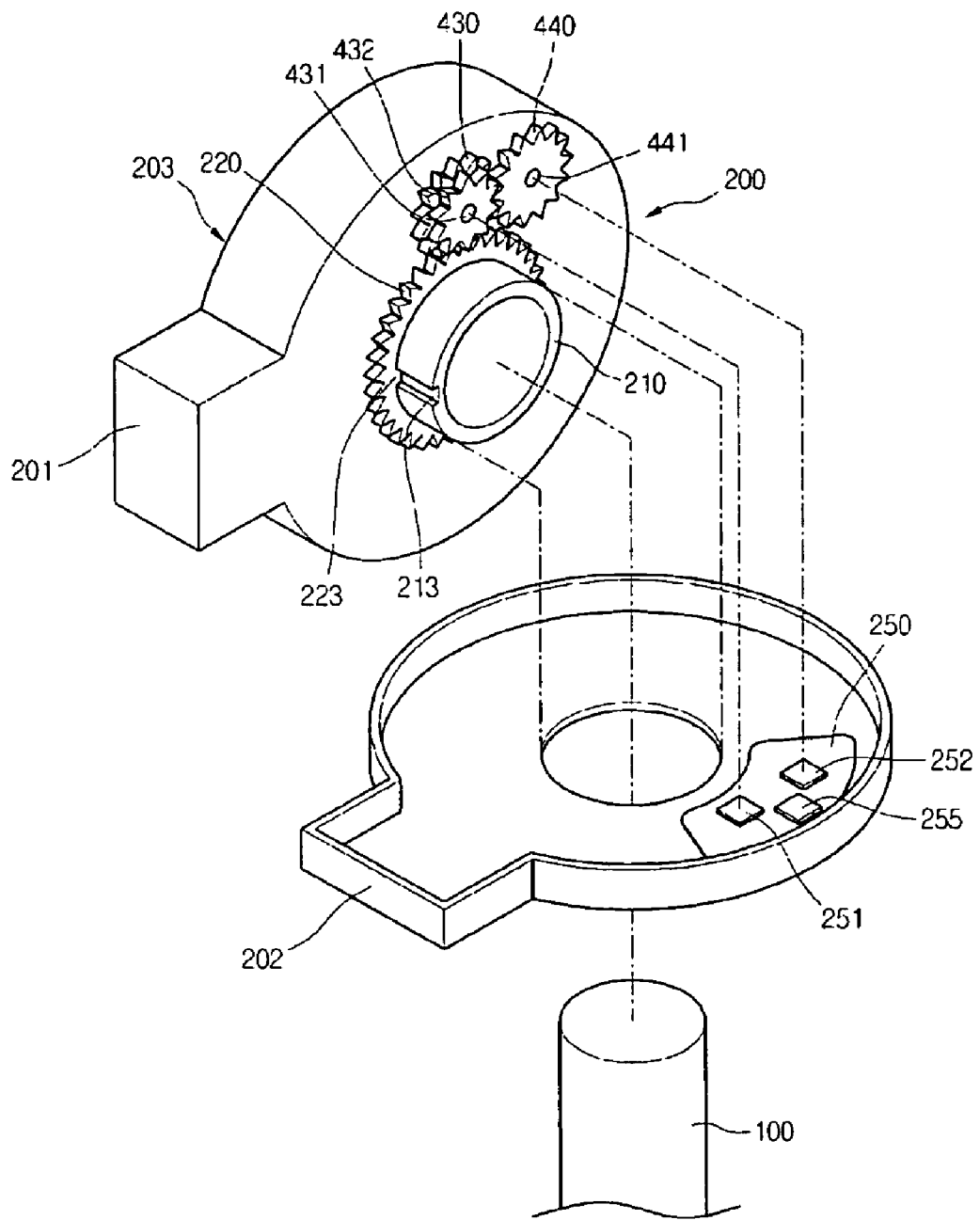
[Fig. 3]

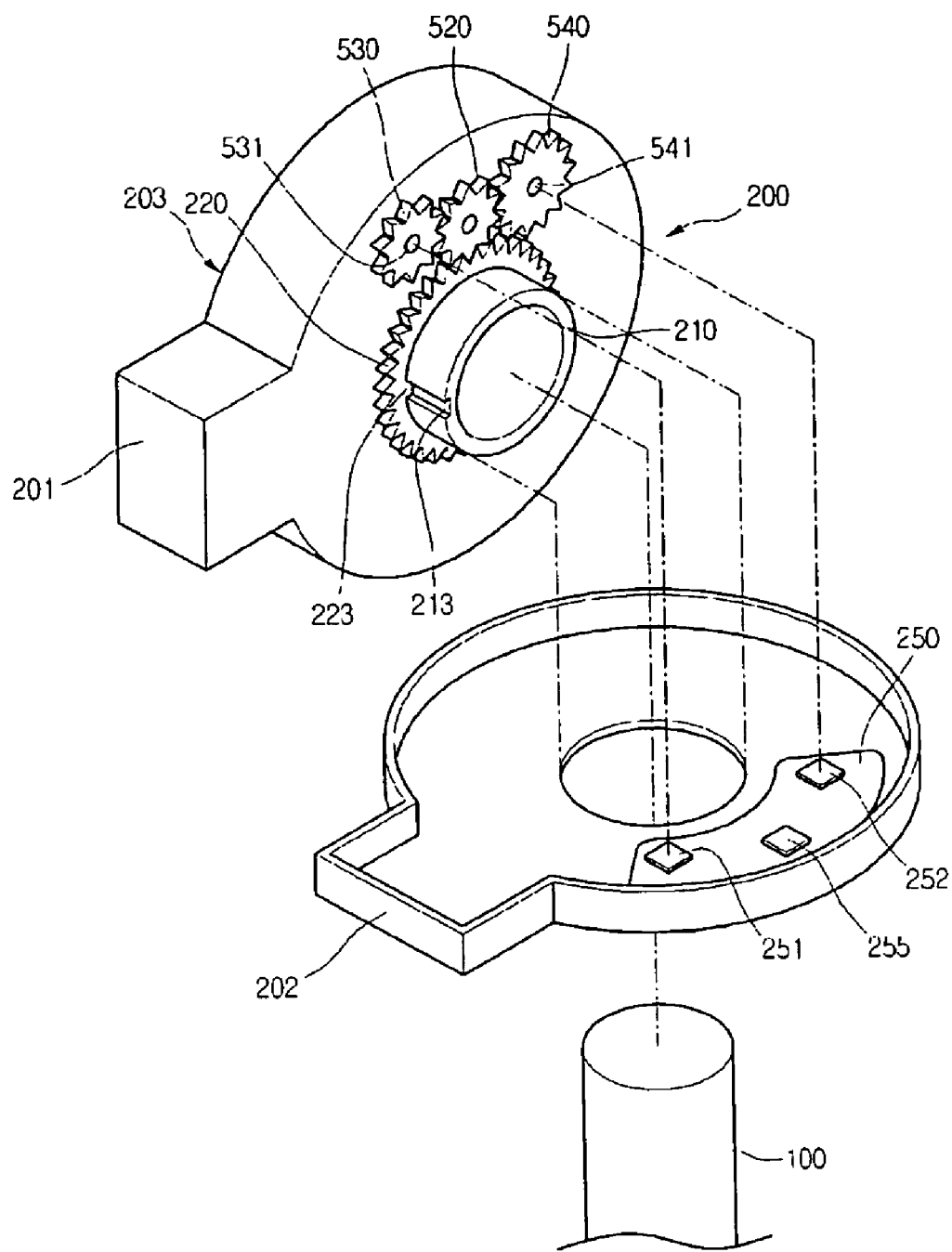
[Fig. 4]

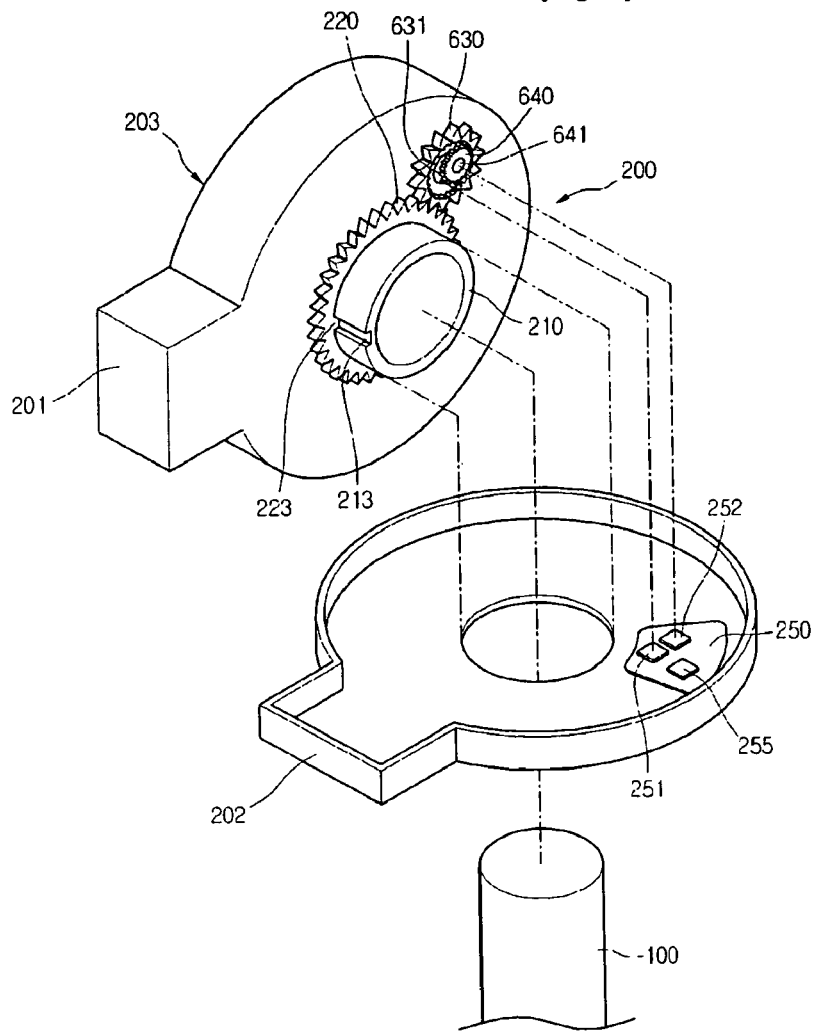
[Fig. 5]
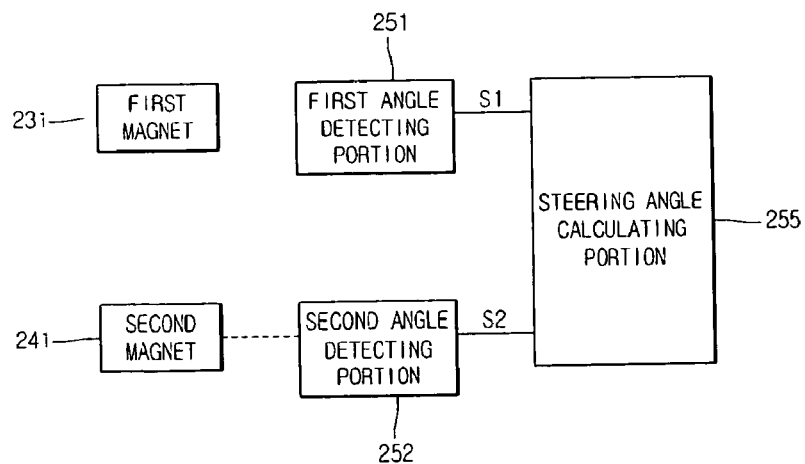
[Fig. 6]

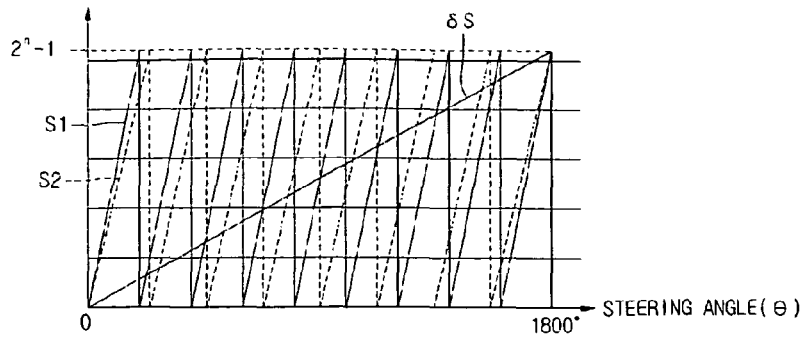
[Fig. 7]
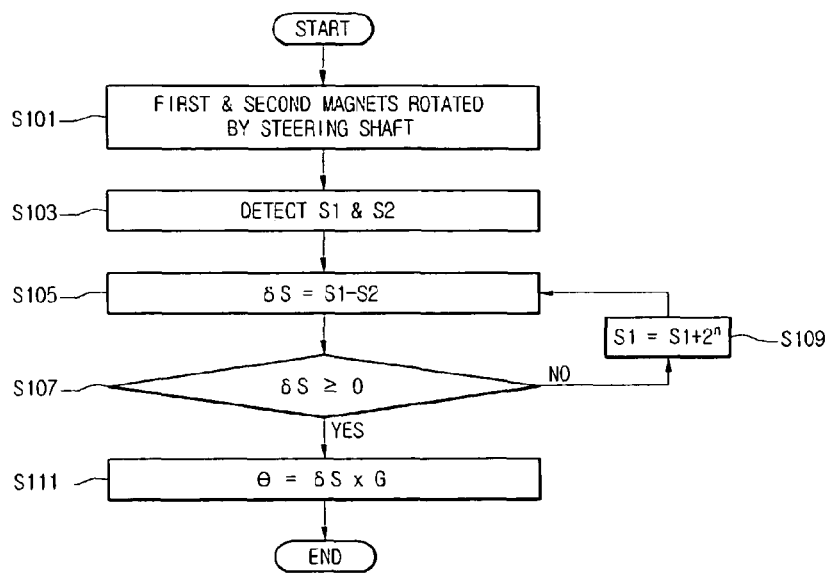
[Fig. 8]
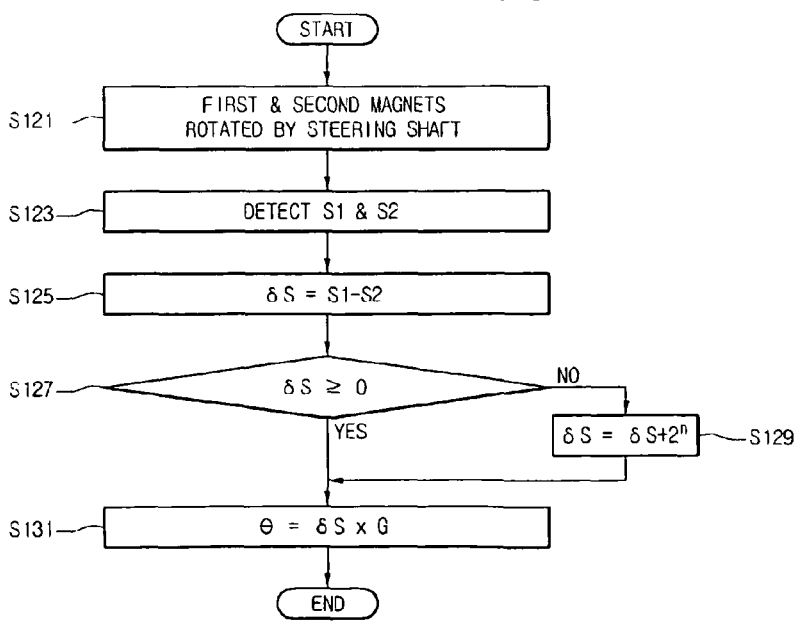
[Fig. 9]

STEERING ANGLE SENSING APPARATUS AND METHOD THEREOF

CROSS-REFERENCE TO RELATED APPLICATION

This application is the U.S. national stage application of International Patent Application No. PCT/KR2007/003414, filed Jul. 13, 2007, the disclosure of which is hereby incorporated by reference in its entirety.

TECHNICAL FIELD

Embodiments relate to a steering angle sensing apparatus and a steering angle sensing method.

BACKGROUND ART

A steering mechanism that is an indispensable part of an automobile is a mechanism that alters the path and direction of travel of the automobile according to a driver's wishes. Such a steering mechanism includes a steering wheel controlled by the driver, a steering shaft connected to the steering wheel for relaying the steering inputs from the driver, and a sensing apparatus installed on the steering shaft for sensing the angle of the steering wheel (steering angle).

Typically, a steering wheel connected to a steering shaft is capable of rotating 2-3 turns clockwise and counterclockwise. A steering sensor capable of accurately detecting the rotated direction and steering angle of a steering shaft is required.

DISCLOSURE OF INVENTION

Technical Problem

Embodiments provide a steeling angle sensing apparatus and method capable of detecting an absolute steering angle by digitally processing the rotated angles of magnets coupled to the shafts of a plurality of sub gears rotated by a shaft gear.

Embodiments provide a steering angle sensing apparatus and method capable of reducing the margin for errors caused by signal changes, through digital processing following rotated angle sensing of a plurality of magnets.

Technical Solution

An embodiment provides a steering angle sensing apparatus comprising: a shaft gear coupled to a steering shaft; a first sub gear rotating with the shaft gear; a second sub gear engaged with the first sub gear, and having a gear ratio different from a gear ratio of the first sub gear; a first magnet coupled on an axis of the first sub gear; and a second magnet coupled on an axis of the second sub gear.

An embodiment provides a steering angle sensing apparatus comprising: a first magnet rotating with a gear coupled to a steering shaft gear; a second magnet rotating at a rotation cycle different from the first magnet; a first angle detecting portion outputting a first rotated bit value corresponding to a change in a magnetic field of the rotating first magnet; a second angle detecting portion outputting a second rotated bit value corresponding to a change in a magnetic field of the rotating second magnet; and a steering angle calculating portion calculating a steering angle using a difference between the first rotated bit value of the first angle detecting portion and the second rotated bit value of the second angle detecting portion.

An embodiment provides a steering angle sensing method comprising: rotating a shaft gear coupled to a steering shaft; rotating a plurality of sub gears with mutually different gear ratios together with the shaft gear; outputting respective rotated bit values corresponding to changes in magnetic fields of a plurality of magnets, the magnets respectively coupled on an axis of each of the sub gears; and obtaining a steering angle of the steering shaft through using a difference in rotated bit values of the plurality of magnets.

ADVANTAGEOUS EFFECTS

An advantage of the above-structured steering angle sensing apparatus and method according to the embodiment is that an absolute steering angle can be detected using a simple calculation by digitally outputting rotated angles of magnets that rotate at respectively different rates according to the rotation of a shaft gear.

Also, the possibilities of errors occurring during signal conversion can be reduced by eliminating the process of converting analog signals to digital signals.

Additionally, because there is no process of converting signals, reliability and processing speed are improved, and a cost reduction can be derived from the omission of an analog/digital converter.

Furthermore, a smaller steering angle sensing apparatus can be provided.

Moreover, a combined sensor that senses steering angle as well as steering angle torque can be provided.

BRIEF DESCRIPTION OF THE DRAWINGS

FIG. 1 is a perspective view of a steering angle sensing apparatus according to a first embodiment.

FIG. 2 is a perspective view of a steering angle sensing apparatus according to a second embodiment.

FIG. 3 is a perspective view of a steering angle sensing apparatus according to a third embodiment.

FIG. 4 is a perspective view of a steering angle sensing apparatus according to a fourth embodiment.

FIG. 5 is a perspective view of a steering angle sensing apparatus according to a fifth embodiment.

FIG. 6 is block diagram of the steering angle sensor in FIG. 1 and a steering angle calculating unit.

FIG. 7 is a graph showing an example of deriving steering angles using values outputted by an angle detecting portion based on the rotation of two shaft gears, according to steering angle sensing embodiments.

FIG. 8 is a flowchart of a steering angle sensing method according to a first embodiment.

FIG. 9 is a flowchart of a steering angle sensing method according to a second embodiment.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

FIG. 1 is a perspective view of a steering angle sensing apparatus according to a first embodiment.

Referring to FIG. 1, a steering angle sensing apparatus 200 includes a shaft gear 220 coupled to a steering shaft 100, a first sub gear 230, a first magnet 231, a second sub gear 240, a second magnet 241, a first angle detecting portion 251, a second angle detecting portion 252, and a steering angle calculating portion 255.

The steering angle sensing apparatus 200 may be provided within a case 201 and a cover 202. The shaft gear 220, the first sub gear 230, the first magnet 231. The second sub gear 240, and the second magnet 241 are disposed on the inner side of the case 201. A circuit board 250 is disposed on the inner side of the cover 202, and the first angle detecting portion 251, the second angle detecting portion 252, and the steering angle calculating portion 255 are disposed on the circuit board. Here, the steering angle calculating portion 255 may be disposed on another circuit board.

When a driver manipulates a steering wheel (not shown) the movement is transferred through the steering shaft 100 to the shaft gear 220. The shaft gear 220 is coupled to the outer circumference of the steering shaft 100 and rotates together with the steering shaft 100. Here, the shaft gear 220 may be directly coupled to the steering shaft 100 or coupled through the output shaft 210 of a steering torque sensor 203, and is not limited to these two conditions.

The steering torque sensor includes a torque sensor (not shown), a torsion bar (not shown), and the output shaft 210 installed within the case 201.

The shaft gear 220 is coupled to the outer perimeter of the output shaft 210 of the steering torque sensor 203. For example, a protrusion 223 formed in the inner circumference of the shaft gear 220 inserts in a slot 213 formed in the outer circumference of the output shaft 210. Here, the positions and numbers of the protrusion 223 and the slot 213 may be altered.

The shaft gear 220 rotates with the steering shaft 100 2-3 turns in a clockwise or counterclockwise direction. For example, the steering shaft 100 may be designed to turn 720°-1080° in one direction, but is not limited to this range of rotation.

The first sub gear 230 and the second sub gear 240 are respectively engaged to the shaft gear 220, and rotate together with the shaft gear 220. The first sub gear 230 and the second sub gear 240 have different gear ratios, and the gear ratio of the second sub gear 240 may be greater than the gear ratio of the first sub gear 230. For example, when the shaft gear 220 turns one revolution, the first sub gear 230 may rotate more than the second sub gear 240.

As an example, if the shaft gear 220, the first sub gear 230, and the second sub gear 240 have a respective gear ratio of 1:8:7.5, when the shaft gear 220 rotates once, the first sub gear 230 rotates 8 times, and the second sub gear rotates 7.5 times. The two sub gears are not limited thereto, and the second sub gear may have a greater gear ratio than the first sub gear.

The first magnet 231 is coupled to the axis of the first sub gear 230, and rotates together with the first sub gear 230. The second magnet 241 is coupled to the axis of the second sub gear 240, and rotates together with the second sub gear 240. The first magnet 231 and the second magnet 241 may be formed of one of a bipolar permanent magnet, electromagnet, and magnetized metal with at least two poles—N and S.

The first magnet 231 and the second magnet 241 rotate according to the rotation of the first sub gear 230 and the second sub gear 240, and their magnetic fields change according to their rotation.

The first angle detecting portion 251 faces the first magnet 231 at a uniform distance, and the second angle detecting portion 252 faces the second magnet at a uniform distance. Here, the spaces between the two angle detecting portions 251 and 252 and the two magnets 231 and 241 may be the same or different.

The first angle detecting portion 251 and the second angle detecting portion 252 are mounted on the circuit board 250 and may be formed respectively of rotary hall integrated circuits (ICs). The rotary hall ICs include at least a magnetic sensor. Such rotary hall IC sensors detect changes in magnetic fields according to the rotation of the respective magnets 231 and 241 in real time, and convert the detected magnetic field values into digital values for outputting.

The first angle detecting portion 251 and the second angle detecting portion 252 respectively detect the changes in the magnetic fields of the first and second magnets 231 and 241 according to the rotation of the shaft gear 220, and output digital data corresponding to the detected changes in magnetic fields.

The steering angle calculating portion 255 first calculates the difference between the digital data of the first angle detecting portion 251 and the digital data of the second angle detecting portion 252, and then detects an absolute steering angle corresponding to the difference in digital data values. Here, the absolute steering angle can accurately detect the steering portion of an automobile's steering wheels even when electrical power is turned off and back on. For this purpose, the circuit board 250 may further include a storage portion (not shown) for storing rotated bit values of the first angle detecting portion 251 and the second angle detecting portion 252 and steering angles.

The operation of the above steering angle sensing apparatus 200 can be described as follows.

When a driver handles a steering wheel, the steering shaft 100 connected to the steering wheel turns. When the steering shaft 100 rotates, the shaft gear 220 rotates with the shaft. The first sub gear 230 and the second sub gear 240 with respectively different gear ratios are rotated at different speeds by the shaft gear 220.

Here, the first magnet 231 coupled on the axis of the first sub gear 230 and the second magnet 241 coupled on the axis of the second sub gear 240 rotate so that their magnetic fields are altered. For example, the positions of the respective N and S poles of the first and second magnets 231 and 241 change according to the rotation of the first and second sub gears 230 and 240.

The first angle detecting portion 251 detects the rotated angle through the change in the magnetic field of the first magnet 231, and a first rotated bit value corresponding to the rotated angle is outputted to the steering angle calculating portion 255.

The second angle detecting portion 252 detects the rotated angle through the change in the magnetic field through the rotation of the second magnet 241, and a second rotated bit value corresponding to the rotated angle is outputted to the steering angle calculating portion 255.

After the steering angle calculating portion 255 calculated the offset between the first rotated bit value of the first angle detecting portion 251 and the second rotated bit value of the second angle detecting portion 252, the steering angle of the steering shaft 100 is detected using the difference between the calculated rotated bit values. The detecting of the steering angle will be described in detail with reference to FIGS. 6 and 7.

FIG. 2 is a perspective view of a steering angle sensing apparatus according to a second embodiment. Like elements in the second and first embodiments are given like reference numerals, and repetitive description thereof will not be given.

Referring to FIG. 2, a steering angle sensing apparatus 200 includes a first sub gear 330 engaged to a shaft gear 220, and a second sub gear 340 engaged to the first sub gear 330. The first sub gear 330 and the second sub gear 340 have respectively different gear ratios, and the gear ratio of the second sub gear 340 may be greater than the gear ratio of the first sub gear 330.

A first magnet 331 is coupled on the axis of the first sub gear 330, and a second magnet 341 is coupled on the axis of the second sub gear 340. Here, because the second sub gear 340 is meshed with the first sub gear 330, the space between the first and second magnets 331 and 341 is reduced. Accordingly, the space between the first angle detecting portion 251 and the second angle detecting portion 252 facing the first and second magnets 331 and 341 is reduced. Thus, the size of the circuit board 250 can be reduced and the steering angle sensing apparatus 203 can also be made smaller.

The first and second angle detecting portions 251 and 252 sense magnetic field changes when the first and second magnets 331 and 341 rotate, and respectively output digital data on the magnetic field changes. The steering angle calculating portion 255 uses the difference in the output data of the first and second angle detecting portions 251 and 252 to detect the steering angle.

FIG. 3 is a perspective view of a steering angle sensing apparatus according to a third embodiment. Like elements in the third and first embodiments are assigned like reference numerals, and repetitive descriptions will not be given.

Referring to FIG. 3, the steering angle sensing apparatus 200 has a first sub gear 430 engaged with a shaft gear 220, and a second sub gear 440 engaged with connecting gear 432 formed on one side of the first sub gear 430.

The connecting gear 432 has a lower gear ratio than the first sub gear 430 and the second sub gear 440.

A first magnet 431 is coupled on the axis of the first sub gear 430 and the connecting gear 432, and a second magnet 441 is coupled on the axis of the second sub gear 430. Here, the space between the first and second magnets 431 and 441 is less than in the first embodiment, so that the space between the first angle detecting portion 251 and the second angle detecting portion 252 is reduced. Therefore, the size of the circuit board 250 may be reduced, and the steering angle sensing apparatus 200 may be made smaller.

The first and second angle detecting portions 251 and 252 detect magnetic field changes according to the rotation of the first and second magnets 431 and 441, and output digital data on the magnetic field changes. The steering angle calculating portion 255 uses the difference between the output data of the first and second angle detecting portions 251 and 252 to detect the steering angle.

FIG. 4 is a perspective view of a steering angle sensing apparatus according to a fourth embodiment. Like elements in the fourth and first embodiments are assigned like reference numerals, and repetitive descriptions will not be given.

Referring to FIG. 4, in the steering angle sensing apparatus 200, a connecting gear 520 is engaged with a shaft gear 220, and a first and second sub gear 530 and 540 are engaged to the connecting gear 520.

Here, a magnet is not provided on the axis of the connecting gear 520, and a first and second magnet 531 and 541 are coupled to the axes of the first and second sub gears 530 and 540. In the fourth embodiment, the first and second sub gears 531 and 541 are not directly meshed with the shaft gear 220, but are engaged indirectly through the connecting gear 520.

Also, the first sub gear 530 has a gear ratio smaller than that of the second sub gear 540. The connecting gear 520 rotates according to the rotating of the shaft gear 220, upon which the first and second sub gears 530 and 540 also rotate.

Here, the first and second angle detecting portions 251 and 252 detect changes in magnetic fields when the first and second magnets 531 and 541 rotate, and respectively output digital data on the magnetic field changes. The steering angle calculating portion 255 uses the difference between the output data of the first and second angle detecting portions 251 and 252 to detect the steering angle.

FIG. 5 is a perspective view of a steering angle sensing apparatus according to a fifth embodiment. Like elements in the fifth and first embodiments are assigned like reference numerals, and repetitive descriptions will not be given.

Referring to FIG. 5, in the steering angle sensing apparatus 200, a first sub gear 630 is engaged to the outer perimeter of the shaft gear 220, and a second sub gear 640 is engaged to the inner circumference of the first sub gear 630. Thus, the gear ratio of the first sub gear 630 is greater than the gear ratio of the second sub gear 640.

A first and a second magnet 631 and 641 are respectively coupled on the axes of the first sub gear 630 and the second sub gear 640. Here, the sizes of the second sub gear 640 and the first magnet 631 may be made so that the first magnet 631 does not cover the second sub gear 640.

Also, the distance between the first magnet 631 and the first angle detecting portion 251 may be different from the distance between the second magnet 641 and the second angle detecting portion 252.

Here, the first and second angle detecting portions 251 and 252 detect changes in magnetic fields according to the rotation of the first and second magnets 631 and 641, and respectively output digital data on the magnetic fields. The steering angle calculating portion 255 uses the difference in the digital data outputted by the first and second angle detecting portions 251 and 252 to detect the steering angle.

FIG. 6 is block diagram of the steering angle sensor in FIG. 1 and a steering angle calculating unit.

Referring to FIG. 6, the first angle detecting portion 251 detects a first rotated angle according to a magnetic field shift with the rotation of the first magnet 231, and outputs a first rotated bit value (S1) as digital data corresponding to the rotated angle.

The second angle detecting portion 252 detects a second rotated angle through a magnetic field shift according to the rotation of the second magnet 241, and outputs a second rotated bit value (S2) as digital data corresponding to the second rotated angle.

The steering angle calculating portion 255 subtracts the second rotated bit value S2 from the first rotated bit value S1 to obtain the rotated bit offset, and multiplies rotated bit offset with a predetermined gain value to detect the steering angle of the steering wheel and steering shaft. Here, the rotated bit value, the rotated bit offset, the gain value, and the steering angle are stored in a storage portion (not shown), and provided to the steering angle calculating portion 255.

This steering angle can be derived through Equation 1 below.

$$\theta = \delta S \times G, \quad \text{Equation 1}$$

where θ is the steeling angle, $\delta S = S1 - S2$, and $0 \leq \delta S \leq 2^n - 1$, and G is the gain value.

S1 is the first rotated bit value corresponding to the rotated angle of the first magnet 231 detected by the first angle detecting portion 251, and S2 is the second rotated bit value corresponding to the rotated angle of the second magnet 241 detected by the second angle detecting portion 252.

Here, δS is a value of the difference of the first rotated bit value S1 and the second rotated bit value S2, where the maximum value is $2^n - 1$, and the minimum value is 0. The 'n' is the number of digital outputted bits of the angle detecting portion.

The gain value G is a value that is preset according to differences between the gear ratios of the shaft gear, the first sub gear, and the second sub gear and the rotated bits.

In this embodiment, the shaft gear is coupled to the steering shaft, and the rotation of the shaft gear prompts the plurality of sub gears and the plurality of magnets to rotate at different intervals. Also, the plurality of angle detecting portions 251 and 252 outputs digital data according to changes in the magnetic fields for the plurality of magnets 231 and 241, and the steering angle calculating portion 255 uses the difference in the digital data to detect the absolute steering angle of the steering shaft. Thus, the steering angle calculating portion can directly use the outputted digital data to quickly detect the steering angle, so that reliability is improved and processing time is shortened.

FIG. 7 is a graph showing an example of deriving steeling angles using values outputted by an angle detecting portion based on the rotation of two shaft gears, according to steering angle sensing embodiments.

The x-axis in FIG. 7 represents the steering angle, and the maximum lock-to-lock steering angle (where the steering wheel is turned from an utmost clockwise position to an utmost counterclockwise position) may be set at 1800°. The y-axis represents the output values of the angle detecting portions and the steering angle calculating portion.

Referring to FIGS. 6 and 7. To obtain the first rotated bit value S1, after the rotated angle of the first magnet 231 detected by the first angle detecting portion 251 is linearly obtained according to rotating cycles, the rotated angle of each rotating cycle becomes the first rotated bit value S1.

To obtain the second rotated bit value S2, after the rotated angle of the second magnet 232 detected by the second angle detecting portion 252 is linearly obtained according to rotating cycles, the rotated angle of each rotating cycle becomes the second rotated bit value S2.

Here, the intervals are different due to the differences in gear ratios. That is, there is a difference between the rotating cycles of the first magnet 231 and the second magnet 232, and this difference can be obtained from the difference between the first rotated bit value S1 and the second rotated bit value S2.

The rotated bit values S1 and S2 of the first and second magnets 231 and 232 are defined as respectively different values within a cycle range of rotated bit sizes $2^n$ ($0-2^n-1$).

The rotated bit difference value ($\delta S$) is represented as a graph that increases at a steady slope according to the rotation of the steering shaft. That is, the difference between the first rotated bit value S1 and the second rotated bit value S2 is calculated as the rotated bit difference value ($\delta S$). Here, if the rotated bit difference value ($\delta S$) is detected to be below 0, the rotated bit size $2^n$ for one cycle is added to $\delta S$ or S1.

By multiplying the gain value to the rotated bit difference value ($\delta S$), the steering angle ($\theta$) can be derived. For example, when the rotated bit difference value ($\delta S$) is 200 bits and the gain is 3.6, the steering angle can be derived as follows: $200 \times 3.6 = 720°$.

FIG. 8 is a flowchart of a steering angle sensing method according to a first embodiment.

Referring to FIG. 8, the shaft gear rotates through the rotation of the steering shaft, and the first and second sub gears having respectively different gear ratios rotate according to the rotation of the shaft gear. Here, the first and second magnets coupled on the axes of the first and second sub gears rotate in S101. The gear ratio of the first sub gear is smaller than that of the second sub gear.

When the magnetic fields of the first and second magnets change, the first and second angle detecting portions output in S103 a first and second rotated bit value S1 and S2 as rotated angles according to the changes in magnetic fields of the first and second magnets.

When the first and second rotated bit values S1 and S2 are inputted in the steering angle calculating portion, the second rotated bit value S2 is subtracted from the first rotated bit value S1, and the rotated bit difference value ($\delta S$) is derived in S105. It is determined in S107 whether the derived rotated bit difference ($\delta S$) is 0 or more. Here, the rotated bit difference value ($\delta S$) is derived by subtracting the rotated bit value of the magnet with the higher rotating cycle from the rotated bit value of the magnet with the lower rotating cycle.

If the rotated bit difference is determined to be 0 or more in S107, the gain (G) value is multiplied to the subtracted result, to obtain the steering angle ($\theta = \delta S \times G$) in S111. Here, the gain value is a preset value.

If the subtracted result is less than 0, the bit size for one cycle ($2^n$) is added to the first rotated bit value (S1) in S109, and the revised first rotated bit value and the second rotated bit value are subtracted, and S105 is revisited to obtain the rotated bit difference ($\delta S$).

FIG. 9 is a flowchart of a steering angle sensing method according to a second embodiment.

Referring to FIG. 9, the shaft gear rotates due to the rotation of the steering shaft, and the first and second sub gears having different gear ratios rotate due to the rotation of the shaft gear. Here, the first and second magnets that are coupled on the axes of the first and second sub gears rotate in S121. The gear ratio of the first sub gear is smaller than that of the second sub gear.

When the magnetic fields of the first and second magnets are altered, the first and second angle detecting portions output first and second rotated bit values S1 and S2 corresponding to the rotated angles of the first and second magnets in S123.

When the first and second bit values S1 and S2 are inputted by the steering angle calculating portion, the second rotated bit value S2 is subtracted from the first rotated bit value S1 to obtain the rotated bit difference $\delta S$ in S125. It is determined in S127 whether the rotated bit difference is 0 or higher.

If the rotated bit difference $\delta S$ is 0 or higher, a gain (G) value is multiplied to the subtracted result to detect the steering angle ($\theta = \delta S \times G$) in S131. Here, the gain value is a preset value.

If the rotated bit difference $\delta S$ is less than 0, a one cycle bit size $2^n$ is added to the obtained rotated bit difference to revise the rotated bit difference in S129, and the steering angle is obtained in S131.

While the present invention has been described and illustrated herein with reference to the preferred embodiments thereof, it will be apparent to those skilled in the art that various modifications and variations can be made therein without departing from the spirit and scope of the invention. Thus. It is intended that the present invention covers the modifications and variations of this invention that come within the scope of the appended claims and their equivalents.

INDUSTRIAL APPLICABILITY

In the steering angle sensing apparatus and method of embodiments herein, by outputting changes in magnetic fields (of magnets that rotate at respectively different cycles according to the rotation of a shaft gear coupled to a steering shaft) as digital data, an absolute steering angle can be obtained using a simple calculation, for a high industrial applicability.

Also, because there is no need to convert analog signals to digital signals, the chance of errors-occurring during the conversion process is reduced.

Furthermore, due to there being no signal converting process, the reliability and processing speed are increased, and the price is reduced due to the omission of an analog/digital converter.

Additionally, a smaller steering angle sensing apparatus can be provided.

Moreover, a multi-purpose steering sensor combining a steering angle sensing apparatus with a torque sensing apparatus can be provided.

The invention claimed is:

1. A steering angle sensing apparatus comprising:
   a shaft gear coupled to a steering shaft;
   a first sub gear rotating with the shaft gear;
   a second sub gear engaged with the first sub gear, and having a gear ratio different from a gear ratio of the first sub gear;
   a first magnet coupled on an axis of the first sub gear;
   a second magnet coupled on an axis of the second sub gear;
   a first and a second angle detecting portion spaced a predetermined distance respectively from the first and second magnets, and respectively outputting rotated hit values corresponding to rotated angles of the first and second magnets, wherein the first and second angle detecting portions are rotary hall integrated circuits; and
   a steering angle calculating portion that calculates a difference between the rotated bit values outputted by the first and second angle detecting portions, and multiplies a uniform gain value to the calculated difference between the rotated bit values to obtain an absolute steering angle,
   wherein the first sub gear is formed in the same horizontal plane as the second sub gear.

2. The steering angle sensing apparatus according to claim 1, wherein the gear ratio of the first sub gear is smaller than the gear ratio of the second sub gear.

3. The steering angle sensing apparatus according to claim 1, wherein the second sub gear is directly engaged to an outer circumference or an inner circumference of the first sub gear.

4. The steering angle sensing apparatus according to claim 1, comprising a connecting gear formed at a side of the first sub gear and engaged with the second sub gear.

5. The steering angle sensing apparatus according to claim 1, wherein the first and second magnets comprise a permanent magnet having at least two poles.

6. The steering angle sensing apparatus according to claim 1, wherein the steering angle calculating portion calculates the difference between the rotated bit values through subtracting a rotated bit value of a magnet from the first and second magnets with a longer rotation cycle from a rotated bit value of a magnet from the first and second magnets with a shorter rotation cycle.

7. The steering angle sensing apparatus according to claim 1, wherein when the difference between the rotated bit values is 0, the steering angle calculating portion adds a bit size of one cycle to a rotated bit value of a magnet from the first and second magnets with a shorter rotation cycle or the difference between the rotated bit values.

8. The steering angle sensing apparatus according to claim 1, wherein the difference between the rotated bit values satisfies $0 \leq$ the difference between the rotated bit values $\leq 2^n - 1$, where $2^n$ is a digital bit number for one cycle, and n is a number of bits.

9. The steering angle sensing apparatus according to claim 1, comprising a storage for storing a rotated bit value inputted in the steering angle calculating portion, a rotated bit difference, a gain value, and a steering angle.

10. The steering angle sensing apparatus according to claim 1, wherein the shaft gear is coupled to an outer circumference of an output shaft of a steering torque sensing device.

11. A steering angle sensing apparatus comprising:
    a first magnet rotating with a gear coupled to a steering shaft gear;
    a second magnet rotating at a rotation cycle different from the first magnet;
    a first angle detecting portion outputting a first rotated bit value corresponding to a change in a magnetic field of the rotating first magnet;
    a second angle detecting portion outputting a second rotated bit value corresponding to a change in a magnetic field of the rotating second magnet;
    a steering angle calculating portion calculating a steering angle using a difference between the first rotated bit value of the first angle detecting portion and the second rotated bit value of the second angle detecting portion; and
    a first sub gear engaged with the shaft gear and having the first magnet coupled on an axis thereof;
    wherein the steering angle calculating portion obtains a rotated bit difference value through subtracting a rotated bit value of a magnet from the first and second magnets having a larger rotation cycle from the rotated bit value of a magnet from the first and second magnets having a smaller rotation cycle, and obtains an absolute steering angle through multiplying a uniform gain value to the obtained rotated bit difference value.

12. The steering angle sensing apparatus according to claim 11, comprising a second sub gear engaged with the first sub gear, having a gear ratio different from the first sub gear, and having the second magnet coupled on an axis thereof.

13. The steering angle sensing apparatus according to claim 11, wherein the second sub gear is directly engaged with an inner circumference or an outer circumference of the first sub gear.

14. The steering angle sensing apparatus according to claim 11, comprising a connecting gear formed on a side of the first sub gear and engaged with a gear having the second magnet coupled on an axis thereof.

15. The steering angle sensing apparatus according to claim 11, comprising:
    a third sub gear engaged with the shaft gear; and
    a first and a second sub gear respectively directly engaged with an outer circumference of the third sub gear, and respectively including the first and the second magnet coupled on respective axes thereof, and having respectively different gear ratios.

16. The steering angle sensing apparatus according to claim 11, wherein when the rotated bit difference value is 0 or less, the steering angle calculating portion adds a bit size of one cycle to the rotated bit value of the magnet with the smaller rotation cycle or the obtained rotated bit difference value.

17. A steering angle sensing method comprising:
    rotating a shaft gear coupled to a steering shaft;
    rotating a plurality of sub gears with mutually different gear ratios together with the shaft gear;
    outputting respective rotated bit values corresponding to changes in magnetic fields of a plurality of magnets, the magnets respectively coupled on an axis of each of the sub gears; and obtaining a steering angle of the steering shaft through using a difference in rotated bit values of the plurality of magnets, wherein the difference in rotated bit values is obtained through subtracting a rotated bit value of a magnet from the plurality of magnets with a longer cycle from a rotated bit value of a magnet from the plurality of magnets with a shorter cycle.

18. The steering angle sensing method according to claim 17, wherein the obtaining of the steering angle comprises:

obtaining an absolute steering angle through multiplying the difference in rotated bit values with a gain value, when the difference in rotated bit values is 0 or greater, and obtaining a rotated bit difference through adding a bit size of one cycle to a rotated bit value of a magnet from the plurality of magnets with a shorter cycle, when the difference in rotated bit values is less than 0.

19. The steering angle sensing method according to claim 17, wherein the obtaining of the steering angle comprises:

obtaining an absolute steering angle through multiplying the difference in rotated bit values with a gain value, when the difference in rotated bit values is 0 or greater, and obtaining the absolute steering angle through adding a bit size of one cycle to the difference in rotated values, and multiplying the sum to a gain value, when the difference in rotated bit values is less than 0.

* * * * *